United States Patent [19]

Schmidt et al.

[11] Patent Number: 4,524,928
[45] Date of Patent: Jun. 25, 1985

[54] WING-SECTIONS, IN PARTICULAR AIRCRAFT LIFT-WING SECTIONS

[75] Inventors: Wolfgang Schmidt, Friedrichshafen; Jose M. Longo, Deggenhausertal-Untersiggingen, both of Fed. Rep. of Germany

[73] Assignee: Dornier GmbH, Friedrichshafen, Fed. Rep. of Germany

[21] Appl. No.: 418,064

[22] Filed: Sep. 14, 1982

[30] Foreign Application Priority Data

Oct. 10, 1981 [DE] Fed. Rep. of Germany ....... 3140351

[51] Int. Cl.³ .............................................. B64C 3/14
[52] U.S. Cl. .................................................. 244/35 R
[58] Field of Search ........................... 244/34, 35, 123; 416/223 R

[56] References Cited

U.S. PATENT DOCUMENTS 4,121,787 10/1978 Wilby ................................ 244/35 R
4,413,796 11/1983 Bousquet ......................... 244/35 R

FOREIGN PATENT DOCUMENTS

2712717 9/1978 Fed. Rep. of Germany .... 244/35 R

Primary Examiner—Galen L. Barefoot
Assistant Examiner—Rodney Corl
Attorney, Agent, or Firm—Ralf H. Siegemund

[57] ABSTRACT

A wing-section design for lift-wings, for instance for fighter aircraft, where the section design specifically depends on specially designed top and bottom sides of the section and where the top side curvature along the depth of section depends only upon the operational Mach number, while the bottom side curvature additionally depends on the section thickness and the desired lift range.

9 Claims, 13 Drawing Figures

WING-SECTIONS, IN PARTICULAR AIRCRAFT LIFT-WING SECTIONS

The invention concerns wing-sections, in particular lift-wing sections for aircraft with a design Mach number between about 0.2 and 0.9 and a range of lift from −0.2 to 0.6 in the high-speed range and up to 1.5 in the low-speed range.

It is known that local areas form on the upper side of the wing section for sections of this kind within which the flow is supersonic and which are thought to terminate with slight compression shocks. Accordingly, the areas with supersonic flow speeds may extend relatively far across the chord.

In the past, the design of wing sections when planning aircraft was taken from current wing-section catalogs. Due to the energy crisis, new efforts have been made recently to improve the economy of airplanes.

The trend presently becoming clear is to base special computational procedures on predetermined pressure and velocity distributions on the suction and pressure sides respectively of the wing sections, considered purely aerodynamically. Accordingly, the design of the top side of the wing section is determinant for a recompression low in drag of areas with supersonic flow velocities, that is, for obtaining the highest possible lift at low drag coefficients.

This development resulted for instance in a wing section design corresponding to that of German Offenlegungsschrift No. 2,254,888 with an advantageous drag behavior at high subsonic Mach numbers.

The known wing section design evinces a trailing edge part by means of which the flow at the top side of the section is rapidly accelerated to its maximum value. The top side of the wing section is flattened, whereby the maximum acceleration achieved in the nose area is maintained over a wide range and, accordingly, a constant pressure is claimed to be achieved.

However, because of the sudden pressure rise forming at the rear wing part, increased wing section drag is formed. Unfavorable drag conditions take place in the cited sections; also the design Mach number is exceeded or crossed downward.

Another development trend, for instance that of German Offenlegungsschrift No. 2,626,276, is based on wing sections with a large average nose radius and with an area of decreasing curvature on the section topside joining the wing section nose, where this area extends across a relatively large part of the wing section chord. The lift and performance from low incident flow to supercritical operation without drawbacks in the latter range are claimed to be improved by this design. However, the pressure distribution with the acute suction peak in the nose range together with an increase in the Mach number over the design value and for changes in angles of attack is a drawback.

Moreover, German Offehlegungsschrift No. 2,712,717 discloses a wing section design by which to combine the design features of the two cited trends of development, that is, it seeks to achieve a pressure distribution with a marked suction area at the front wing section from where it drops continuously toward the rear of this section. In the known wing section designs, inherently the geometry of the top side of the section was determinant with respect to a low-drag recompression of supersonic areas, that is, to achieve the highest possible lifts at low drag coefficients.

It is the object of the present invention to provide wing sections, i.e., lift-wings, which offer at a given Mach number, especially also within a range of Mach numbers, as wide as possible a range of lift with advantageous behavior relating to drag and moments. The bottom side of the wing section evinces wide areas within which the flow is supersonic, these supersonic areas being shock-free or terminated only by low shocks.

Moreover, to prevent changes in moments, it is an object of the invention to stabilize the locations of occurring shocks at the top and bottom sides of the wing sections even for changing Mach numbers and changing angles of attack respectively. The low velocity range also is included in this object.

This object is attained by the invention in that
(a) the wing section evinces an area of constant curvature on both the top and bottom sides of the section, each terminated by a maximum of curvature to fix the shock in place, and in that
(b) recompression areas with at least two points of inflection in the contour curvature join the areas of maximum curvature and extend as far as the trailing edge.

In a lift-wing section of the invention, a stable, shock-free supersonic flow is maintained across the area of constant curvature both on the top and bottom sides of the section and also over a large range of lift and Mach numbers.

In particular the design of the bottom side of the wing section provides good aerodynamic properties at small lift coefficients up to high Mach numbers. Designing the bottom side of the wing section together with the top side results in the above-cited good aerodynamic properties, for instance as regards the increase in drag and the buffeting characteristics, not merely at one design point, but rather over a large range of lift. The beginning of recompression or shock is fixed in place regarding the depth of section by the stated maxima of curvature at the top and bottom sides of the section. Accordingly, undesired shock travel, which would entail strong changes in moments, is avoided. This also applies to a changing angle of attack or a changing Mach number. The curvatures with inflection points result in no more than weak shocks or a detachment-free compression.

The stated design is also advantageous for propeller blades and the blades of helicopter rotors, and further can be applied to the blades of turbo engines.

The drawings show two embodiments of the wing section design of the invention which are described in further detail below.

Figure 1:
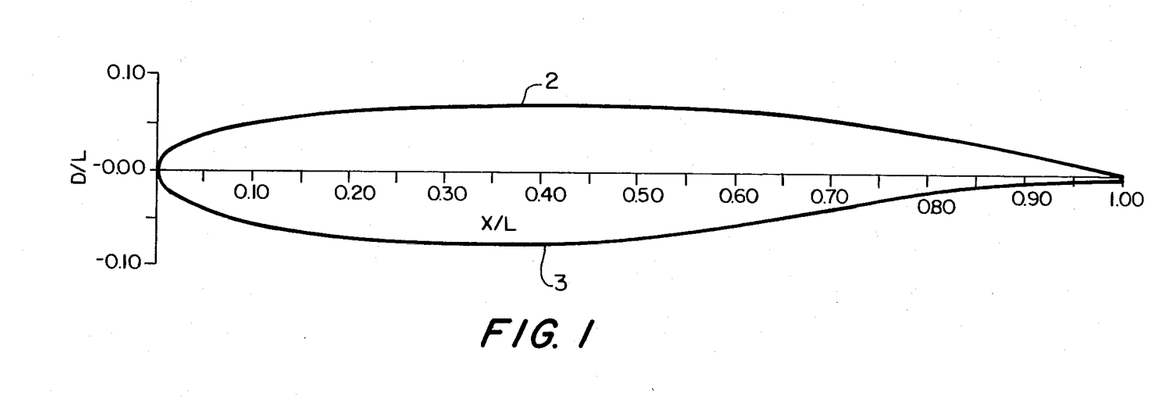
FIG. 1 is a schematic view, on a reduced scale, of the wing section of an illustrative embodiment with a maximum section thickness of 14.5%.
Figure 7:
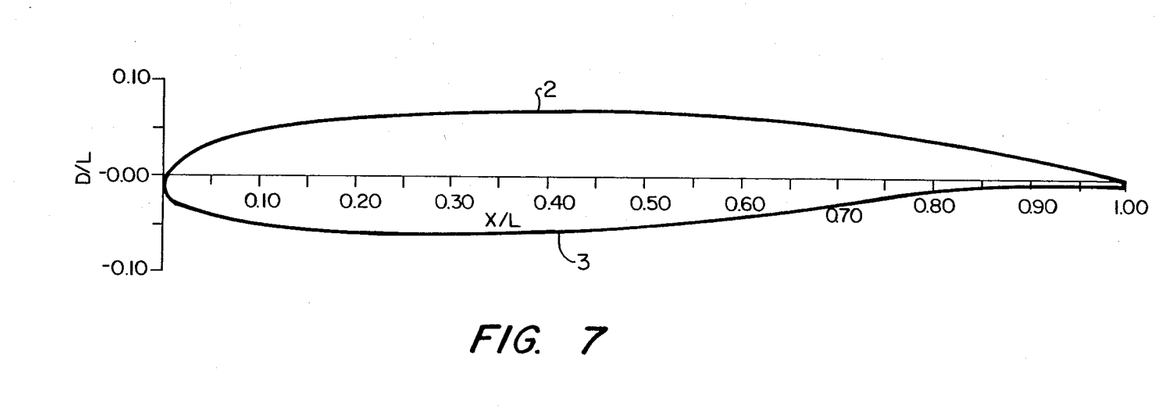
FIG. 7 is a schematic view on a reduced scale of the wing section of a further illustrative embodiment with a maximum wing section thickness of 12.5%.

Two illustrative embodiments of the wing-section design are schematically shown in FIGS. 1 and 7 in a coordinate system where the ordinate is plotted as the relative section thickness $d/1$ and the abscissa as the relative profile depth $x/1$. The point 0 of this coordinate system represents the trailing edge of the wing section. The top side of the section is denoted by 2 and the bottom side by 3.

The same Mach design number applies to the two embodiments of FIGS. 1 and 7, the profile thicknesses however differing. The embodiment of FIG. 1 is based on a 14.5% thick section, and that of FIG. 7 on a 12.5% thick section.

Figure 2:
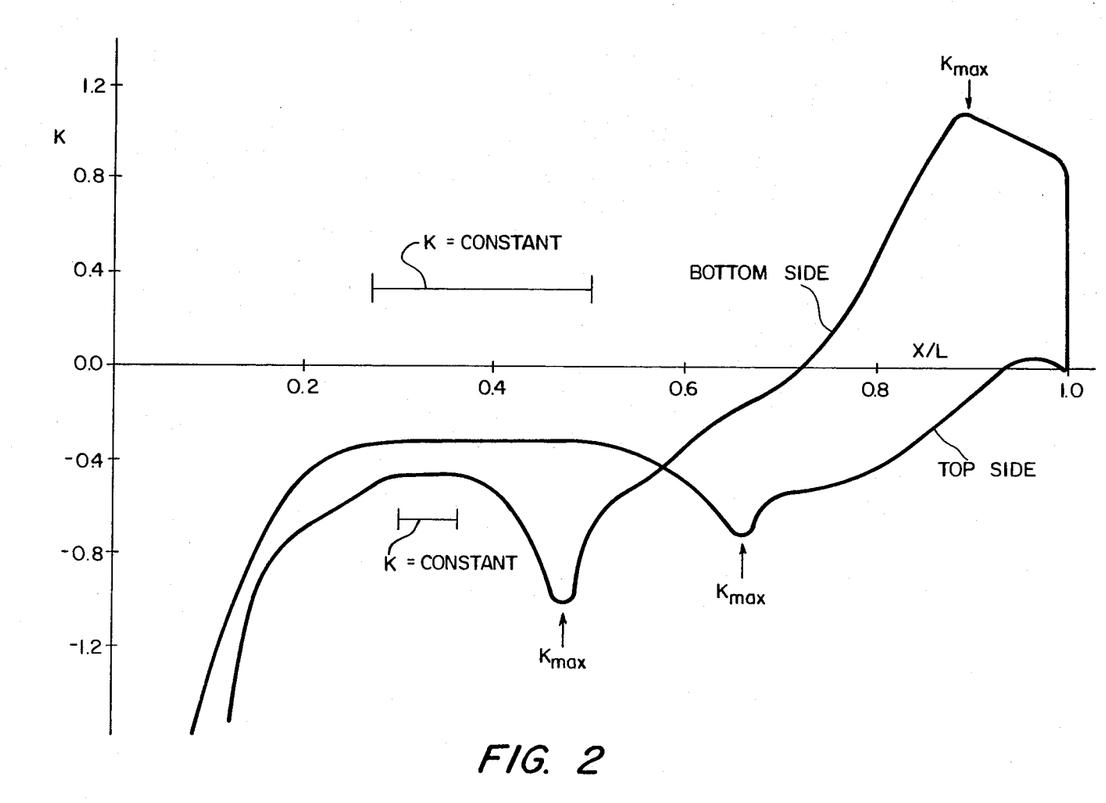
FIG. 2 shows the characteristic curvatures of the top and bottom sides of the wing section shown in FIG. 1.
Figure 3:
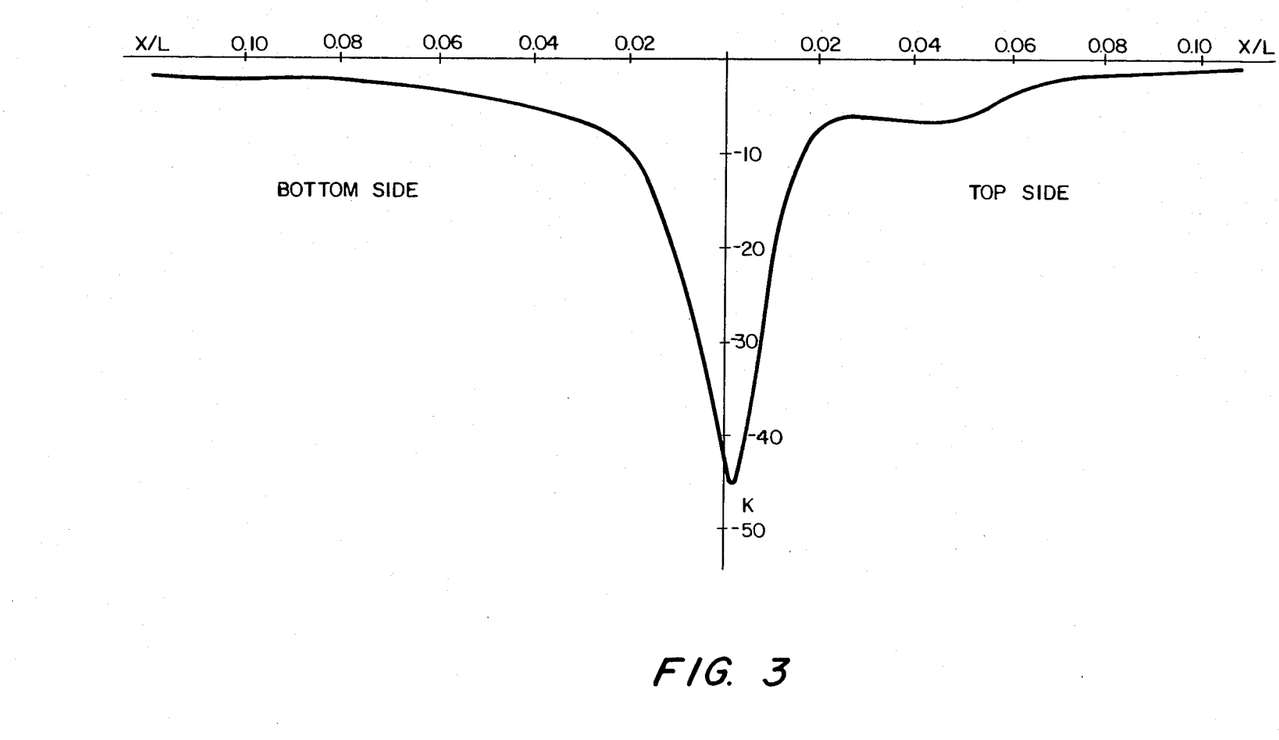
FIG. 3 shows the curvature characteristic in the nose area of the wing section of the top and bottom sides of FIG. 1.
Figure 4:
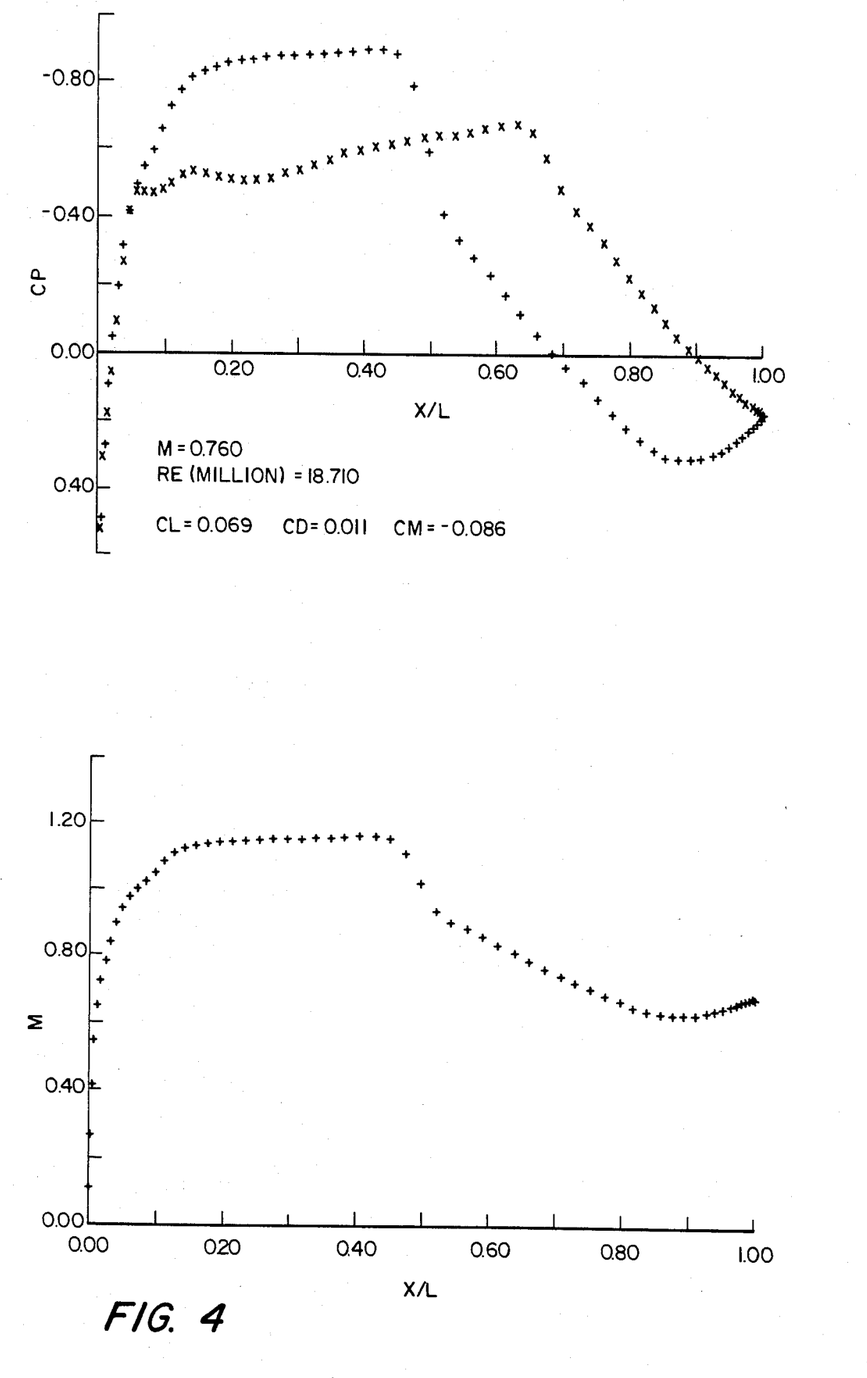
FIG. 4 shows the characteristic pressure distribution at the wing section top and bottom sides and the local distribution of the Mach number for a Mach number of $M=0.760$, a Reynolds number $=18.71\times10^6$ and a lift coefficient $C_a=0.069$ according to FIG. 1.
Figure 8:
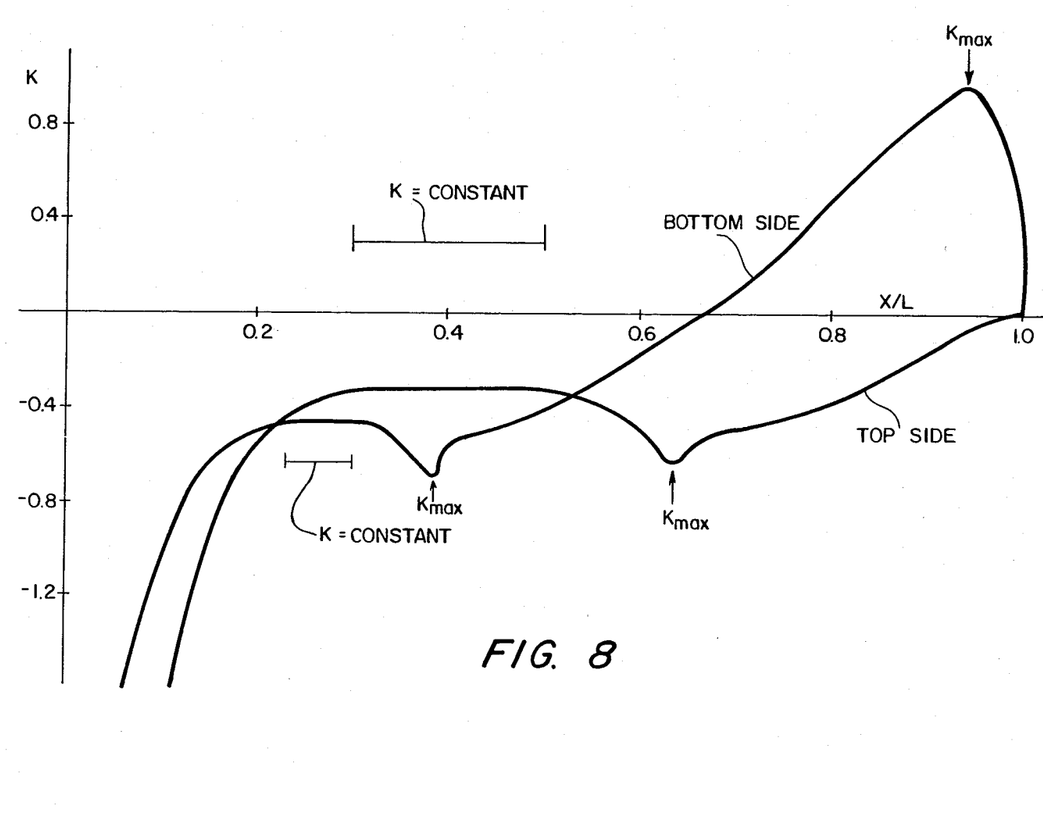
FIG. 8 shows the characteristic curvatures of the top and bottom sides of the wing section of FIG. 7.
Figure 9:
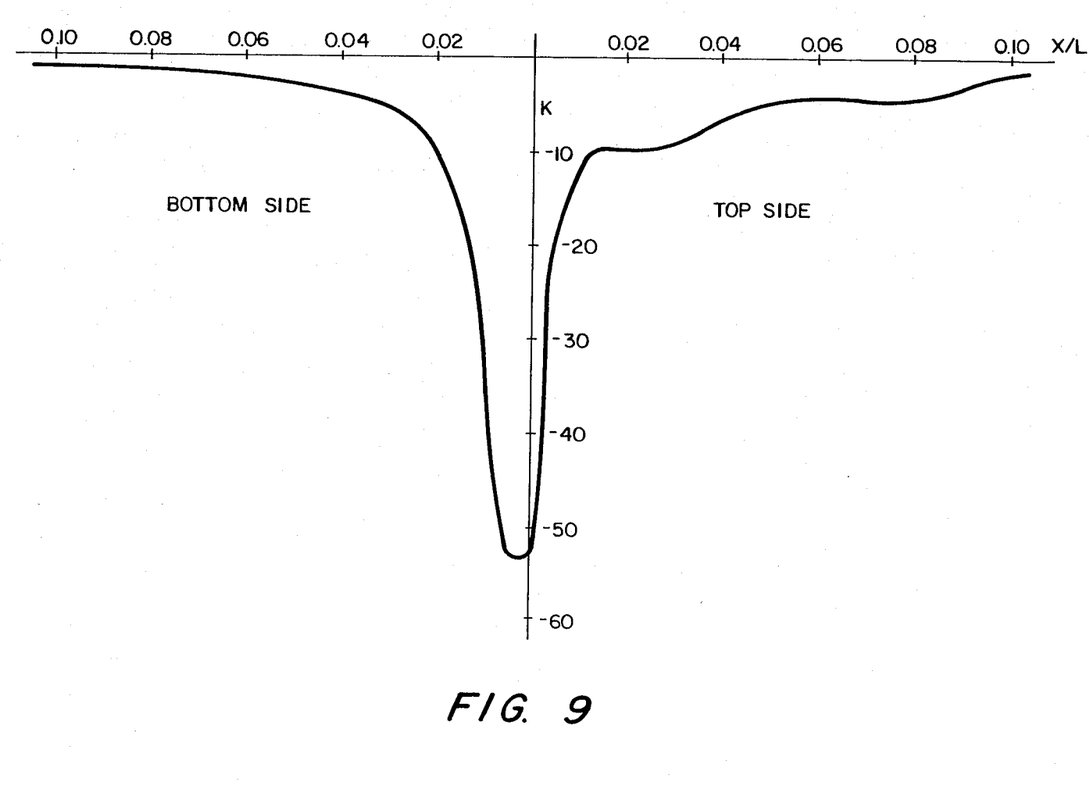
FIG. 9 shows the characteristic curvature of the wing section at the top and bottom sides near the nose area for the section of FIG. 7.
Figure 10:
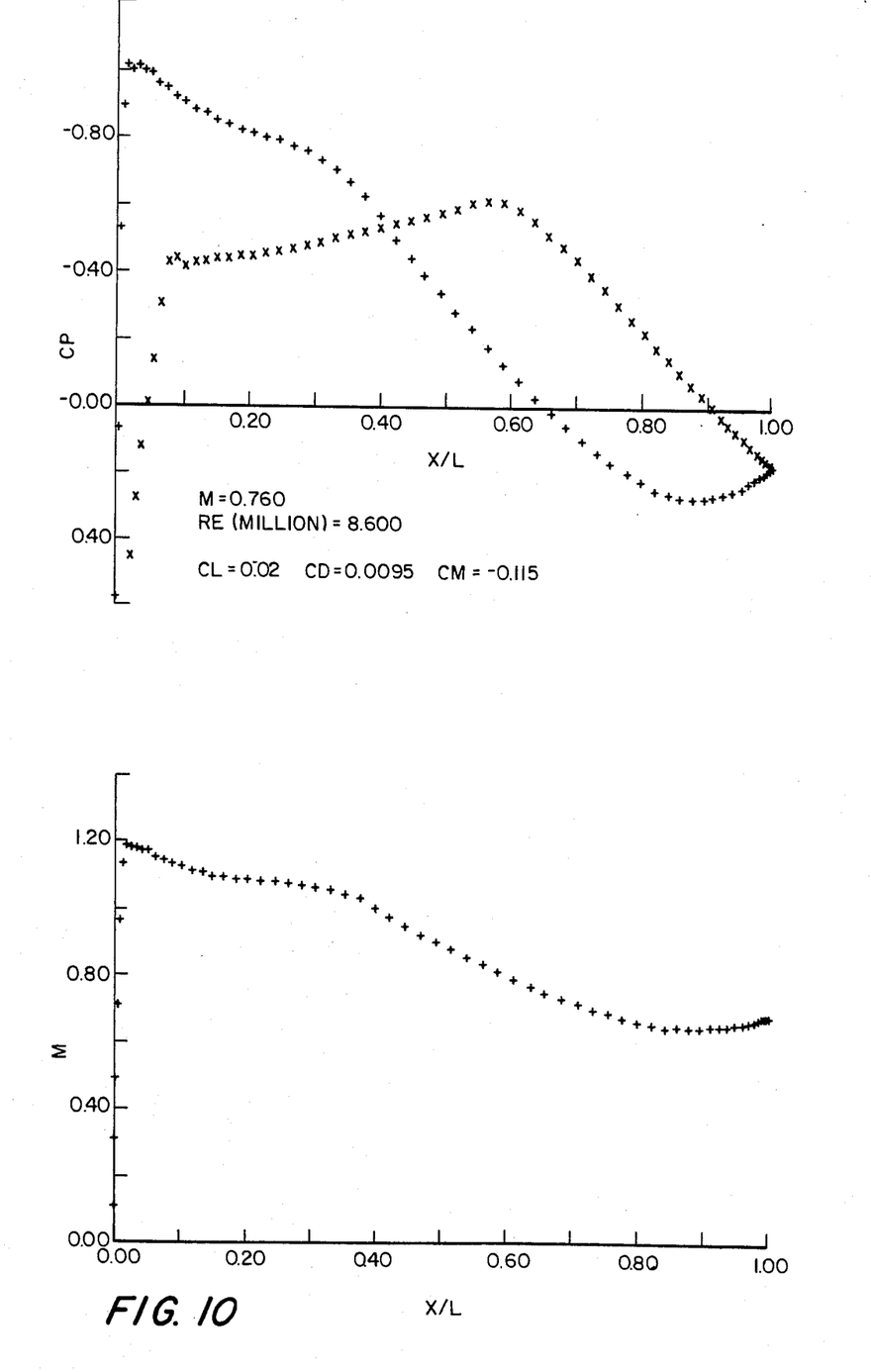
FIG. 10 shows the characteristic pressure distribution at the top and bottom sides of the wing section of FIG. 7 and the local Mach number distribution at the bottom side for a Mach number $M=0.760$, a Reynolds number $Re=8.6\times10^6$ and a lift coefficient $C_a=0.02$.

As shown by FIGS. 2 and 8 for the particular embodiment, the curvature of the top and bottom wing section sides decreases approximately uniformly, namely on the wing section top side 2 down to $(K)=-0.33$ at $x/1=30\%$ and at the wing section bottom side 3 down to $(K)=-0.47$ at $x/1=30\%$ of the section depth in the embodiment of FIG. 1 and at $x/1=25\%$ in that of FIG. 7. In this manner a uniform flow expansion is obtained. If this acceleration leads to local supersonic velocity, then this distribution of the curvature will prevent the customary section peak, i.e., the plateau-like pressure distribution desired in known wing section designs, from which a high moment coefficient $C_M$ would result. The above cited area of curvature continues in an area of constant curvature (within the manufacturing tolerances) on both the wing section top and bottom sides. As shown in FIG. 2, the curvature is constant between $x/1=27\%$ and 50% on the wing section top side 2 and from 30% to 36% on the bottom side 3, and respectively for the second embodiment shown in FIG. 8 at the wing section top side from 30 to 50% and at its bottom side between 23% and 30% of $x/1$.

Figure 5:
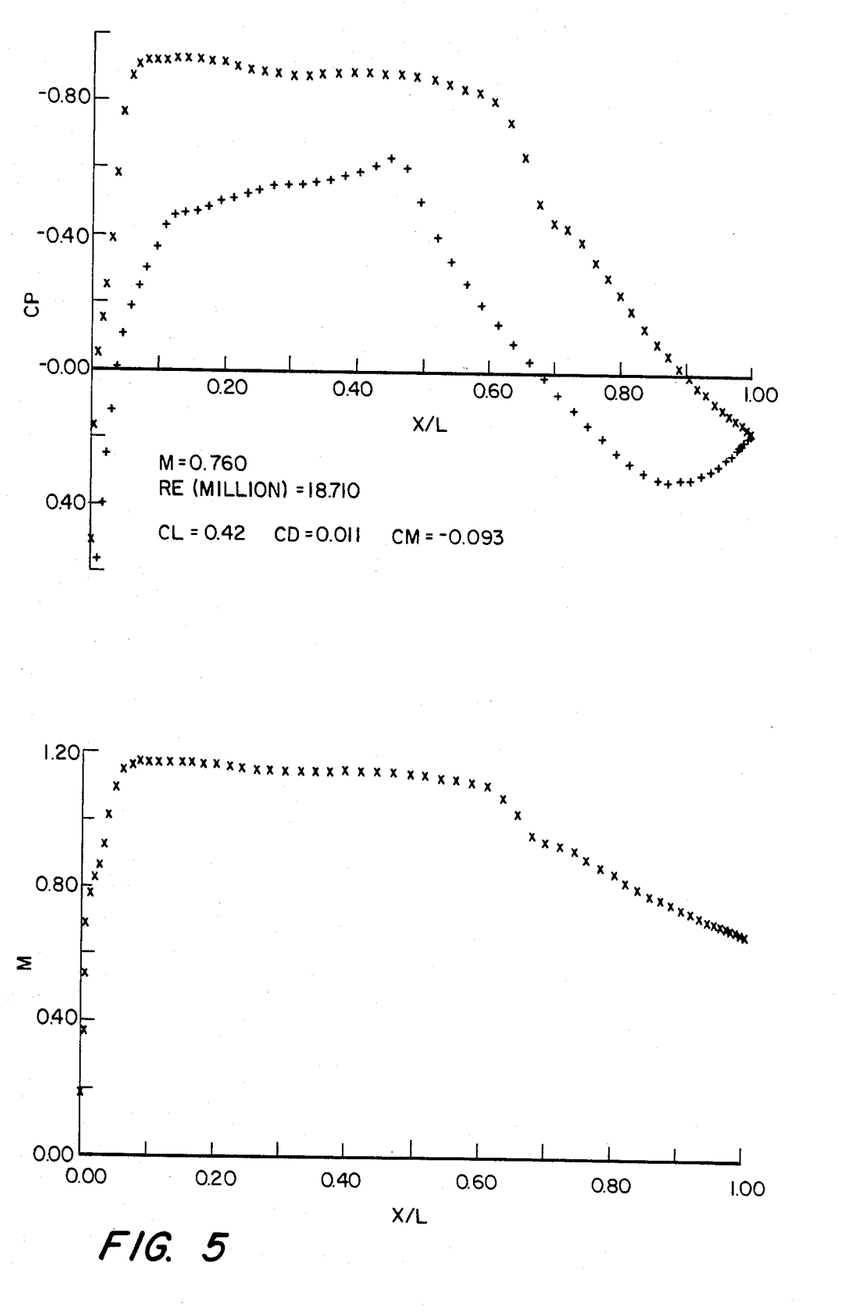
FIG. 5 shows the characteristic pressure distribution at the wing section top and bottom sides and the local Mach number distribution at the section top side for a lift coefficient different from that of FIG. 4 and being $C_a=0.42$.
Figure 6:
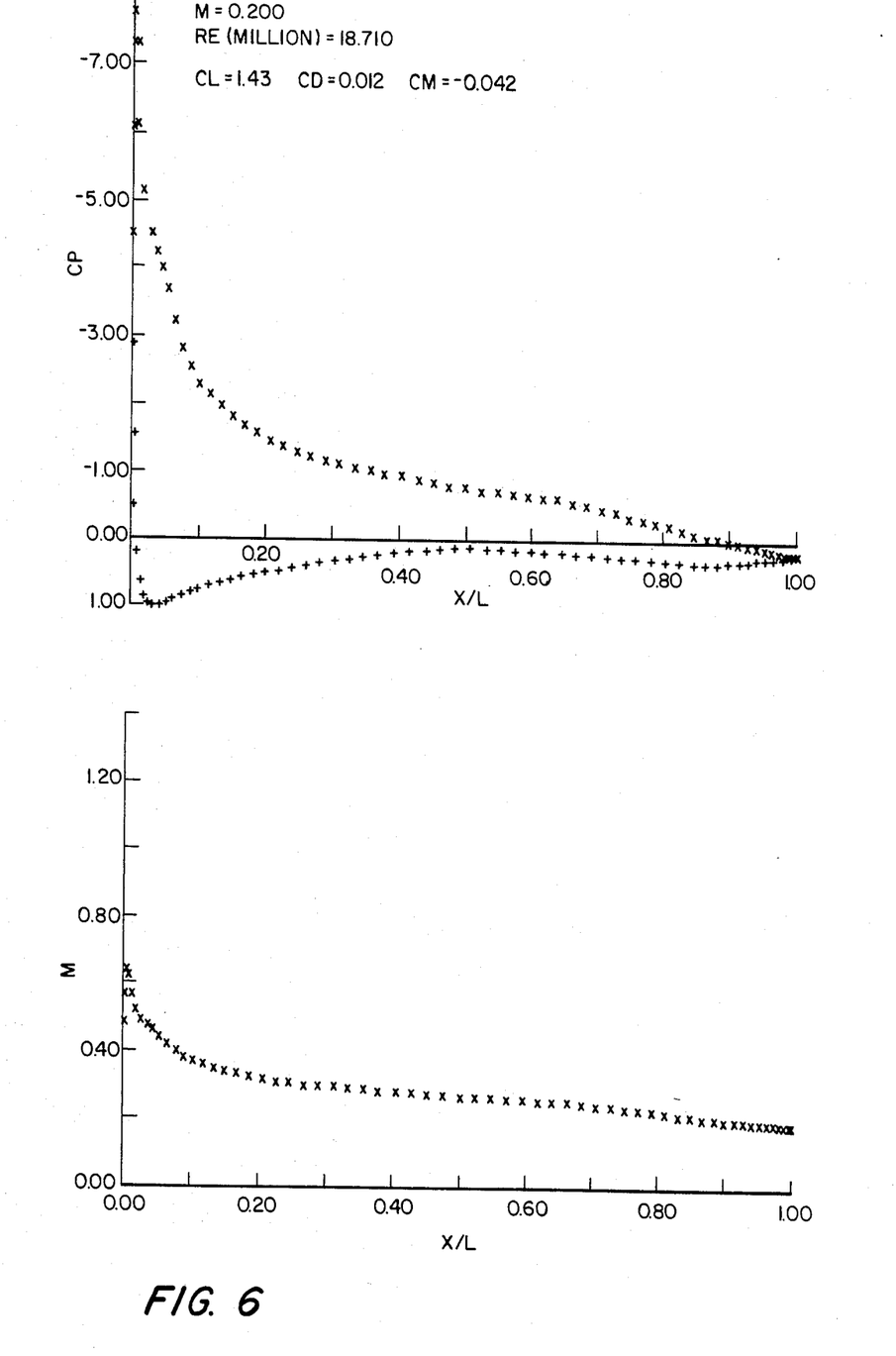
FIG. 6 shows the characteristic pressure distribution at the wing section top and bottom sides and the local Mach number distribution at the section top side and for a low-velocity Mach number of $M=0.20$, a Reynolds number $Re=18.7\times10^6$ and a lift coefficient $C_a$ of 1.43 according to FIG. 1.
Figure 11:
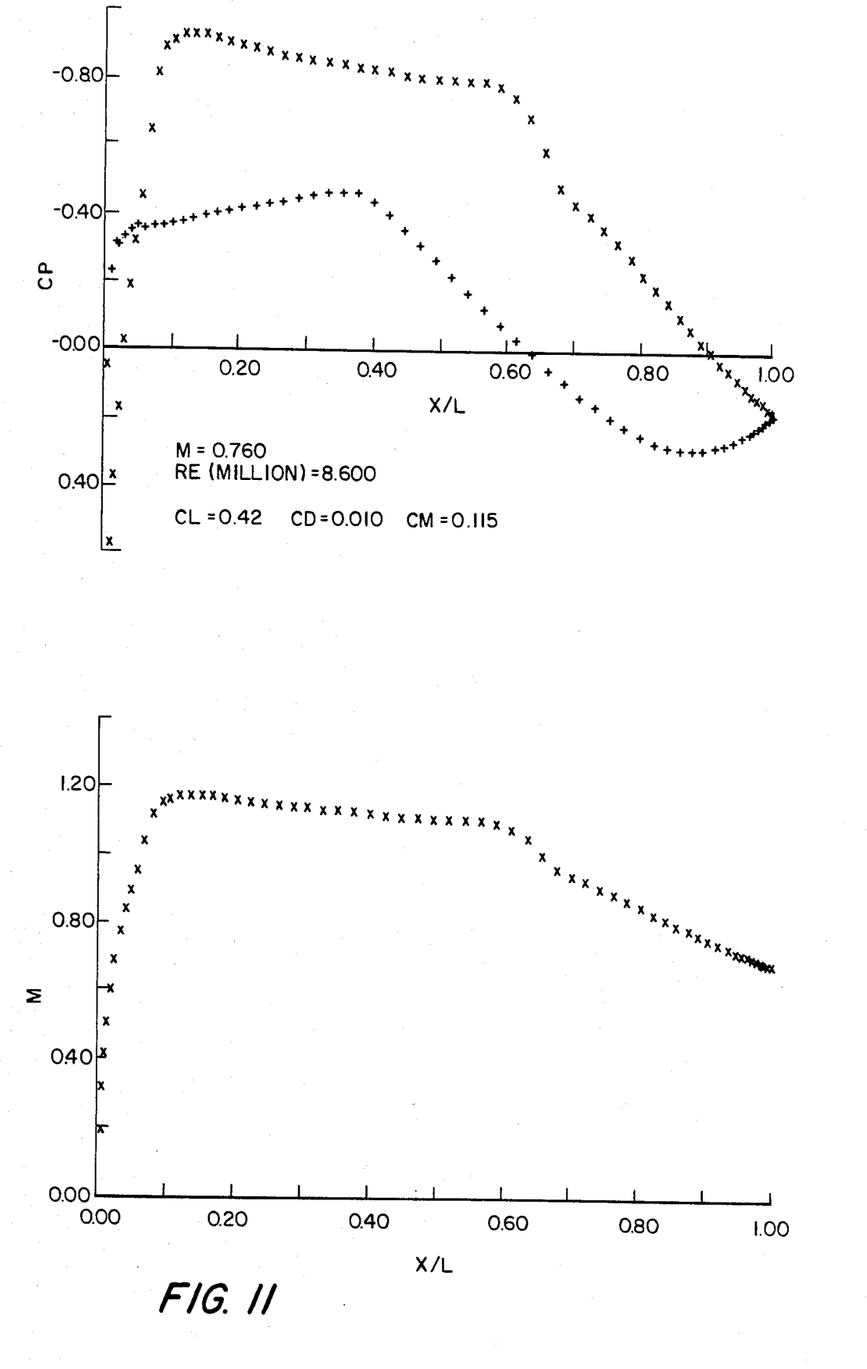
FIG. 11 shows the characteristic pressure distribution at the top and bottom sides of the wing section and the local Mach number distribution at the top side for a lift coefficient of $C_a=0.42$ modified with respect to FIG. 10.
Figure 12:
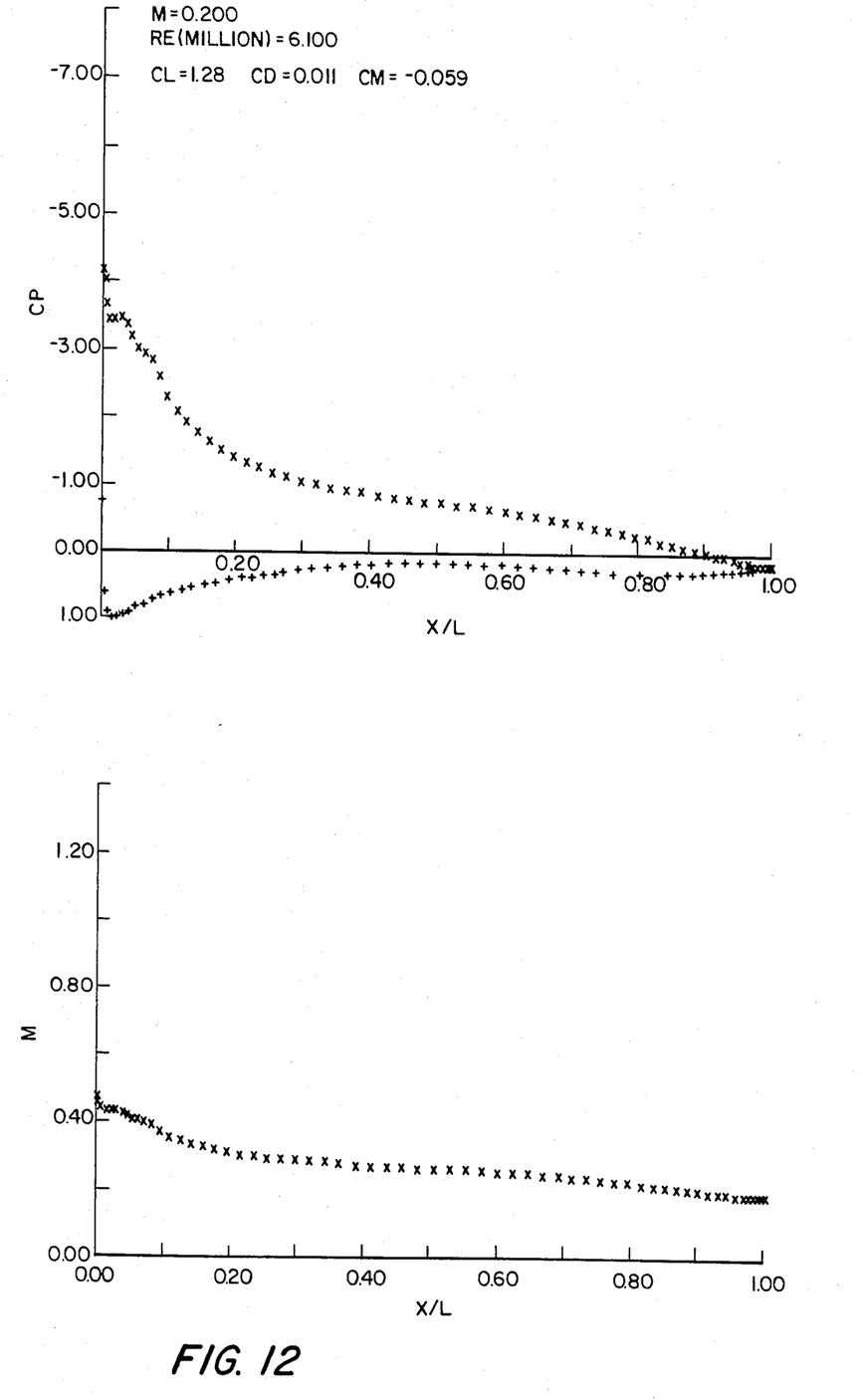
FIG. 12 shows the characteristic pressure distribution at the top and bottom sides of the wing section of FIG. 7 for a low-velocity Mach number $M=0.20$, a Reynolds number $Re=6.1\times10^6$ and a lift coefficient $C_a=1.28$.

These areas of constant curvature result at the particular design points in supersonic flow over the particular part of the section, with a uniformly decreasing supersonic Mach number (for instance note FIGS. 5 and 11).

The area of constant curvature at the wing section top side is independent of the design Mach number and of the lift coefficient, whereas the area of constant curvature at the wing section bottom side does depend on the desired wing section thickness and the above-stated parameters.

Beyond the areas of constant curvature, the curvature increases monotonely, namely through an inflection point to a maximum of curvature.

This curvature function causes a compression, which is nearly fixed in position for both sides of the wing section. Due to low travel of shock, the results are the cited advantageous aerodynamic properties over a wide range of lift and Mach numbers. The decrease in curvature from this maximum at the wing section top side toward null at the section trailing edge takes place in the embodiments described through two points of inflection. This curvature function results in the desired reduction in shock intensity outside the design range, i.e., in a widened applicability of the wing sections.

The final curvature toward the wing section trailing edge is formed by a curvature distribution displacing any trailing edge displacement toward high lift coefficients. Moreover the termination toward a null value is advantageous in manufacturing. As shown in FIG. 2, the terminal area of the wing section top side therefore may be made convex.

Similarly the wing section bottom side is designed beyond the maximum of curvature and corresponding to the top side to reduce intense shocks in a first area for low lift coefficients. For values of $x/1=0.72$ in FIG. 2 and $x/1=0.66$ in FIG. 8, the wing section bottom side is made convex to achieve the desired "rear-loading effect" of heretofore conventional designs.

FIGS. 3 through 9 show on a corresponding scale the curvature function in the nose range of the wing sections, where, deviating from prior known designs of wing sections, no pronounced, circular nose part is present. The curvature distributions present here avoid suction peaks and hence flow detachment at the wing section nose and moreover result at higher Mach numbers (FIG. 5) in high lift-loading of the fore wing section area (front-loading effect) and hence in a desired, lesser pitching moment coefficient.

The design of the wing section nose directly affects the adjoining area of the curvature, as already discussed above in relation to the description of FIGS. 2 and 8.

FIGS. 4 through 6 and 10 through 12 show typical pressure distributions and local Mach number distributions for the wing section designs of FIGS. 1 and 7, as discussed in relation to the curvature distributions.

Figure 13:
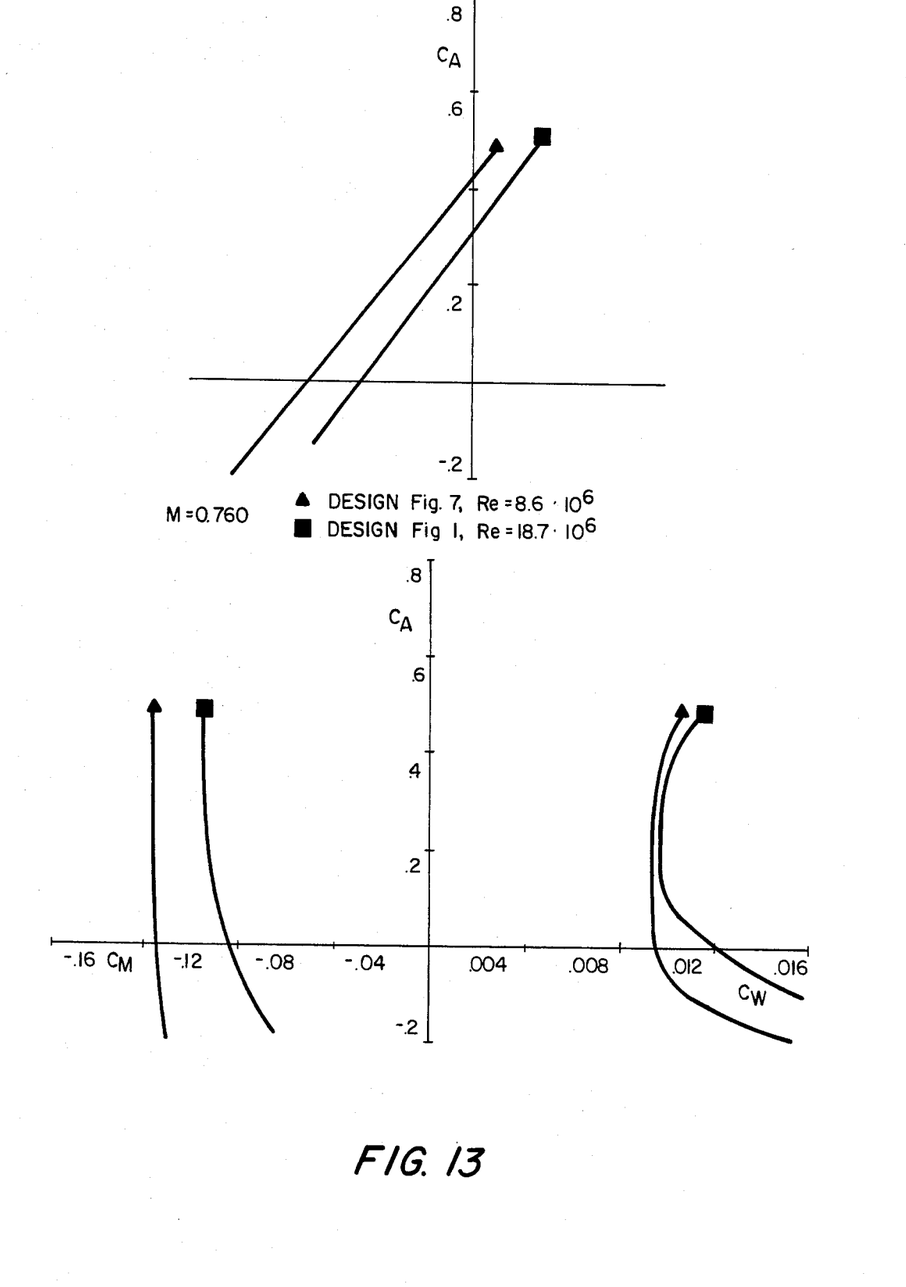
FIG. 13 shows the characteristic lift as a function of angle of attack or moments and drag coefficients as a function of lift coefficient (CM $\triangleq$ coefficient of moments; CD $\triangleq$ drag coefficient).

FIG. 13 shows typical performance data for both wing section designs (FIGS. 1 and 7). The advantages now possible over the previous state of the art are clearly apparent.

These advantages especially are the achievable large range of lift outside the transsonic drag increase, the linear and nearly constant moment function across lift and further the linear lift function at high Mach numbers.

The drawing and the description mutually correspond in their notations for the drag coefficient $C_W \triangleq CD$ and the lift coefficient $C_a \triangleq CL$.

The notations CM and CP are used in the drawing respectively for the moment coefficient and pressure coefficient.

It will be obvious to those skilled in the art that many modifications may be made within the scope of the present invention without departing from the spirit thereof, and the invention includes all such modifications.

What we claim is:

1. Wing sections, in particular lift-wing sections for aircraft with a design Mach number between 0.2 and 0.9 and with a lift range between −0.2 and 0.6 in the high velocity range and up to 1.5 in the low velocity range, in which
    (a) the wing section evinces respectively areas of constant curvature on its top side between 30% and 50% of the relative wing section depth (x/1) and on its bottom side between 20% and 40% of the relative wing section depth (x/1), said areas of constant curvature terminating on each side in a maximum of curvature to stabilize a location of production of shocks and wherein the maximum of curvature at the top side is provided at 60 to 70% of the relative wing section depth, with $|k| > 0.6$ and wherein the maximum of curvature at the bottom side occurs at 35 to 50% of the relative wing section depth; and
    (b) the areas of maximum curvature are joined and continued by recompression areas, with at least two inflection points in the respective contour curvature on top and bottom sides, and extending respectively to the trailing edge.

2. Lift-wing section according to claim 1 in which a first curvature maximum on each of the section top and bottom sides are provided in the nose area with $|k| > 40$, said curvature maximum at 60 to 70% of the relative wing-section depth (x/1) with $|k| > 0.60$ at the top side and said curvature maximum at 35–50% at the bottom side being respectively second curvature maxima at the top and bottom sides.

3. Lift-wing section according to claim 2 including a third maximum of curvature on the bottom side at 85 to 95% of the relative section depth (x/1).

4. Lift-wing section according to claim 1 in which four inflection points of the curvature are provided between 2 and 6%, between 55 and 65%, between 65 and 75%, and between 85 and 95% of the relative wing-section depth (x/1).

5. Lift-wing section according to claim 1 in which the bottom side (3) of this section evinces a decreasing curvature in an area up to 20% of the relative section depth (x/1).

6. Lift-wing section according to claim 1 in which the curvatures at the top and bottom sides overlap between 50 and 60% of the relative section depth.

7. Lift-wing section according to claim 1 in which the top side curvature approaches null at the trailing edge.

8. Lift-wing section according to claim 1 in which the bottom side curvature approaches null at the trailing edge.

9. Lift-wing section according to claim 1 in which outside the nose range, the top side shape is independent of the section thickness.

* * * * *